United States Patent [19]
Day

[11] 3,843,073
[45] Oct. 22, 1974

[54] SPINDLE CONTROL MECHANISM
[75] Inventor: Donald Earl Day, Rochester, N.Y.
[73] Assignee: Eastman Kodak Company, Rochester, N.Y.
[22] Filed: July 25, 1973
[21] Appl. No.: 382,620

[52] U.S. Cl................ 242/204, 242/205, 352/124, 352/166
[51] Int. Cl. ............................................ G03b 1/00
[58] Field of Search .......... 352/124, 159, 157, 158, 352/173, 174, 176, 178, 166; 226/49, 50, 51; 242/201, 204, 205

[56] References Cited
UNITED STATES PATENTS
2,946,585   7/1960   Rosenberg .......................... 242/201

*Primary Examiner*—Monroe H. Hayes
*Attorney, Agent, or Firm*—J. Morrow; William H. J. Kline

[57] ABSTRACT

A mechanism for selectively controlling the mode of operation of the supply spindle of a motion picture projector or the like includes a drive member for rotatably driving the spindle and a brake member for preventing rotation of the spindle. The mechanism is selectively operative between, (1) a first position wherein the spindle is driven by the drive member to wind film onto a reel mounted on the spindle; (2) a second position wherein the brake member restrains the spindle from being driven such that the film reel is restrained from movement; and (3) a third position wherein the brake member and the drive member are disengaged from the spindle and do not influence the operation of the spindle, thereby permitting the spindle to freely rotate such that film can be readily removed from the reel.

9 Claims, 6 Drawing Figures

PATENTED OCT 22 1974
3,843,073
SHEET 1 OF 2
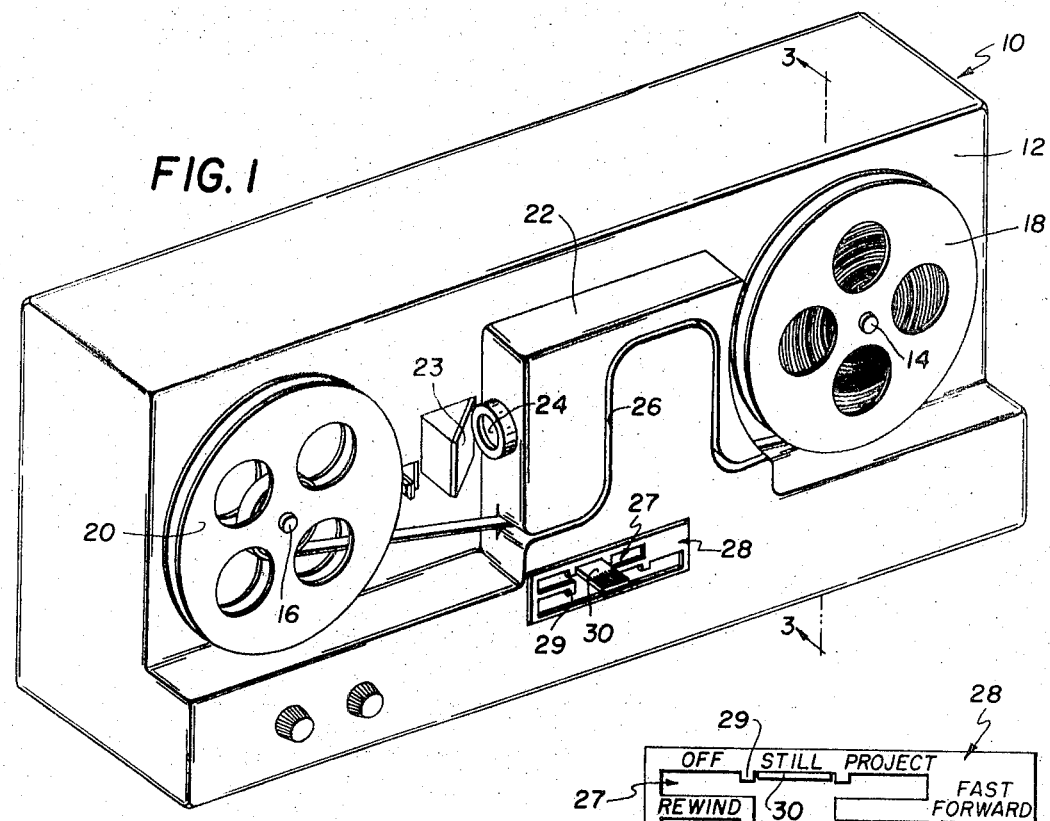
FIG.1
FIG.2
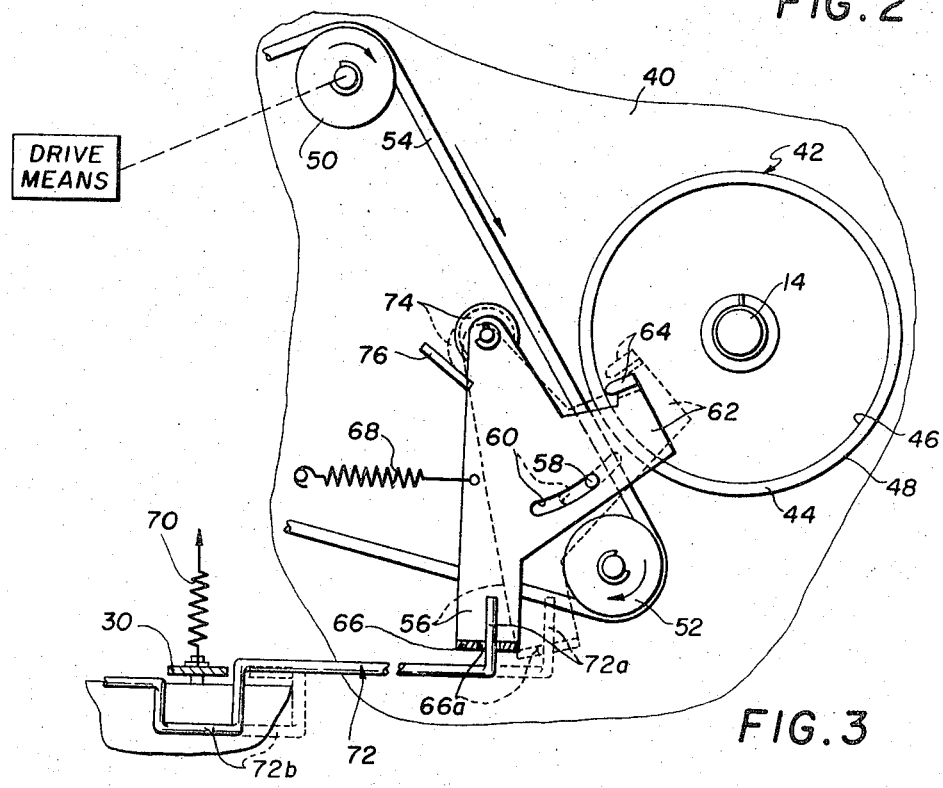
FIG.3

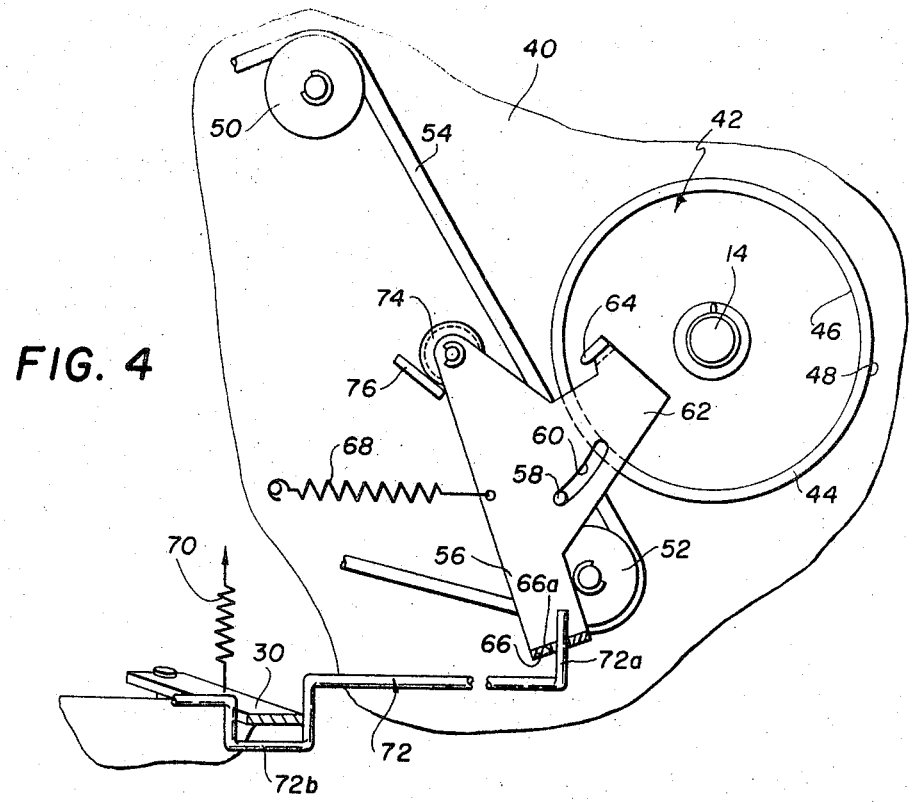
FIG. 4
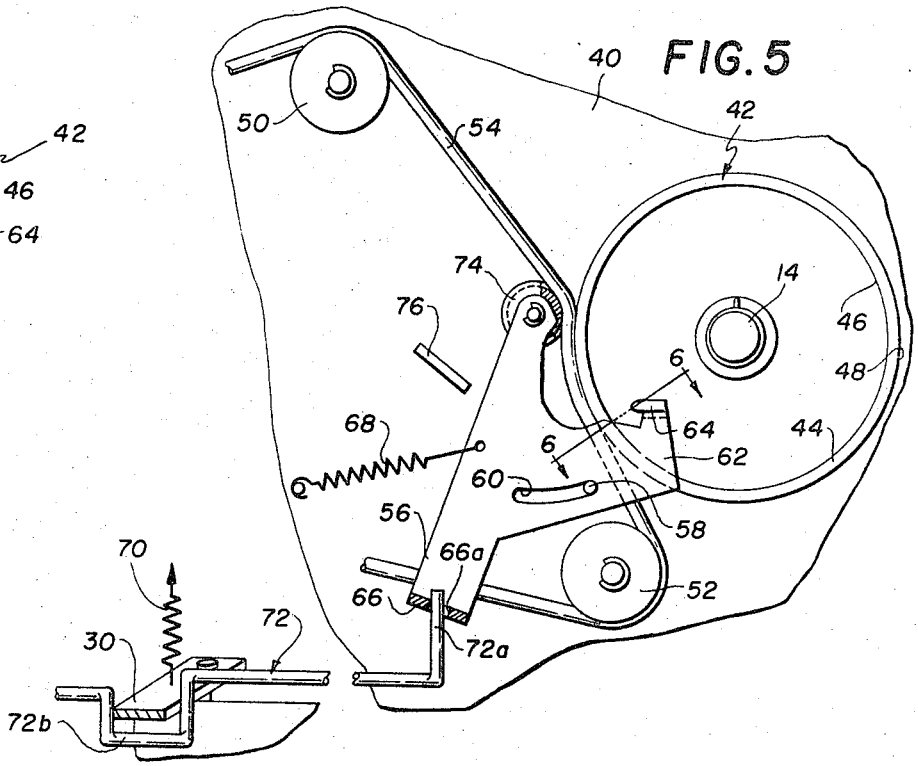
FIG. 5
FIG. 6

SPINDLE CONTROL MECHANISM

CROSS-REFERENCE TO RELATED APPLICATIONS

Reference is hereby made to commonly assigned U.S. patent applications Ser. No. 294,709, entitled, REEL DRIVING DEVICE FOR A WEB TRANSPORTING APPARATUS, filed Oct. 3, 1972, in the name of Donald O. Easterly; United States Patent Application Ser. No. 382,621, entitled, CONTROL MECHANISM FOR A WEB TRANSPORTING DEVICE, filed July 25, 1973, in the name of Donald O. Easterly; and U.S. patent application Ser. No. 382,636, entitled PROJECTOR FUNCTION CONTROL MECHANISM, filed July 25, 1973, in the names of Donald O. Easterly and Donald E. Day.

BACKGROUND OF THE INVENTION

1. Field of the Invention

The present invention relates to a control mechanism for web transporting apparatus and, more particularly, to an improved mechanism for controlling the mode of operation of a supply spindle of a motion picture projector.

2. Description of the Prior Art

Various spindle control mechanisms are known for braking and driving spindles in web transporting apparatus. Generally, these mechanisms are very complex and therefore expensive. The present invention, on the other hand, provides an inexpensive, simple and highly reliable braking and driving mechanism for controlling the mode of operation of the supply spindle of a web transporting apparatus.

SUMMARY OF THE INVENTION

An object of the present invention is to eliminate the necessity for expensive, complex braking and drive systems for the spindle of a web transporting apparatus by providing a simplified spindle control mechanism which readily permits selective changes in the mode of operation of the spindle.

Another object of the invention is to provide a braking and drive mechanism which permits selection of the mode of operation of the spindle of a web transporting apparatus by means of a single manually movable function selector member.

A further object of the invention is to provide a positive and reliable spindle control mechanism which can be moved by a single control member to selectively cause the spindle to be braked and driven or to permit the spindle to be freely rotatable.

Briefly, these and other related objects are realized in accordance with a preferred embodiment of the present invention by driving and braking means engageable with a rotatable spindle which supports a received web material for winding and unwinding, the driving and braking means being selectively moved by control means between (1) a first position wherein the driving means is engaged with the spindle causing the spindle to be rotatably driven from winding the web material; (2) a second position wherein the braking means restrains the spindle from being rotatably driven; and (3) a third position wherein said driving and braking means are disengaged from the spindle.

The invention and its objects and advantages will become apparent in the detailed description of the preferred embodiment presented below.

BRIEF DESCRIPTION OF THE DRAWINGS

In the detailed description of the preferred embodiment presented below, reference is made to the accompanying drawings in which:

FIG. 1 is a perspective view of an illustrative motion picture projector incorporating a control mechanism according to the present invention;

FIG. 2 is an enlarged elevational view of the selection plate and control lever of the projector as shown in FIG. 1 illustrating various operating positions;

FIG. 3 is a sectional view taken along lines 3—3 of FIG. 1 showing a preferred embodiment of the present invention being positioned in the still mode of operation (shown in solid) and the project position (shown in phantom);

FIGS. 4 and 5 are sectional views similar to FIG. 3 showing the device positioned for fast forward and rewind modes of operation, respectively; and FIG. 6 is a sectional view along line 6—6 of FIG. 5 showing greater detail of portions of the preferred embodiment of the present invention as illustrated in FIG. 2.

DESCRIPTION OF THE PREFERRED EMBODIMENT

Because motion picture projectors and related apparatus are well known, the following description is directed in particular to the elements forming part of or cooperating directly with the present invention. Elements not specifically shown or described herein being understood to be selectable from those known in the art.

Referring first to FIG. 1 of the accompanying drawings, the illustrative projector 10 comprises a box-like housing 12 for the various internal components hereinafter described. A pair of spaced film reel spindles 14 and 16 project from the housing to removably support the respective film supply and take-up reels 18 and 20 in a common plane at the opposite ends of one side of housing 12. Housing 12 includes a portion 22 that projects into the plane between the reels 18 and 20. A projection lens 24 projects from housing portion 22 and the optical axis of the lens is oriented to direct light from a lamp (not shown) onto a mirror 23. A slot in housing portion 22 defines a film path 26 which extends between the two reels, between the lamp and the projection lens 24 and through a film gate (not shown) therebetween, and past a film advancing mechanism (not shown) that is located along the film path within housing portion 22. The movement of the film along path 26 is controlled by the operator moving a selection lever 30 along a generally H shaped opening or slot 27 in the face plate 28 to the "off," "still," "project," "rewind" or "fast forward" positions which are identified upon the enlarged face plate depicted in FIG. 2. Movement of the selection lever 30 to the various operating positions affects the spindle control mechanism of the present invention as will be discussed in greater detail and also controls other projection linkage (not shown) which has been described in detail in the before-mentioned commonly assigned copending U.S. patent application Ser. No. 382,621, entitled, CONTROL MECHANISM FOR A WEB TRANSPORTING DEVICE filed on even date herewith in the name of Donald O. Easterly, and U.S. patent application Ser. No. 382,636, entitled, PROJECTOR FUNCTION CONTROL MECHANISM filed on even date herewith in the names of Donald O. Easterly et al. As best shown in FIG. 2, there are a plurality of downward extending protrusions such as shown at 29 which are secured along the opening 27 and are effective to positively maintain the selection lever 30 in the "off," "still," "project," "rewind" or "fast forward" position once the operator has moved the lever to determine the desired mode of operation of the projector.

Referring now in detail to FIGS. 3 through 5, the film reel spindle 14 is rotatably supported by a frame plate 40 which is carried by the projector casing 12. Secured to spindle 14 is a circular drum 42 having a projecting peripheral lip 44 that defines a cylindrical internal braking surface 46 and a cylindrical external driving surface 48. Also supported by frame plate 40 is an idler pulley 52 and a drive pulley 50. A continuous elastic belt 54 is trained around pulley 52 and is driven in a clockwise direction as viewed in the drawings by drive pulley 50 through conventional drive means as schematically indicated in FIG. 3.

A control plate 56 is pivotally mounted to the frame plate 40 by a pivot stud 58 received in an arcuate slot 60 in the plate. Control plate 56 includes an extension 62 which supports a friction pad or brake shoe 64 as shown in FIG. 6 wherein it is in position to be moved into contact with the braking surface 46 to brake or retard rotation of the drum 42. Also supported by the control plate 56 is freely rotatable idler roller 74 which is aligned for urging the belt 54 into engagement with the driving surface 48 of drum 42 as shown in FIG. 6 for rotatably driving the drum 42 as will be explained in detail later.

As shown in FIGS. 3 through 5, selection lever 30 acts through a control rod 72 to alter the position of the control plate 56 and thereby change the operating mode of the supply spindle 14. Control rod 72 includes an end portion 72a which extends through an opening 66a in extension 66 of control plate 56 and also includes a generally "U-shaped" portion 72b which cooperates with selection lever 30 such that lateral movement of the shifting lever will produce corresponding relative movements of the shifting lever of the control rod 72 and the control plate 56. When the selection lever 30 is positioned for still mode of operation (the position shown in solid in FIG. 3), a spring 68 urges control plate 56 in a counterclockwise direction about pivot stud 58 thereby urging friction pad 64 to contact braking surface 46 such that rotation of drum 42 and spindle 14 is resisted and advancement of film from the supply reel 18 is retarded. Once the selection lever 30 has been positioned for the still mode of operation, lever 30 is urged upward by a spring 70 which serves to maintain the lever along the opening of face plate 28 in position between the protrusions until the shifting lever is repositioned by the operator.

When the operator shifts the selection lever 30 to the project position in the upper right portion of the opening 27 in plate 28 (the position shown in phantom in FIG. 3), to condition the projector for operation in its projection mode, lever 30 acts through the control rod 72 rotate or pivot control plate 56 in a counterclockwise direction about pivot stud 58. As this occurs, spring 68 urges the rotatable drive roller 74 into contact with a stop member 76 which is secured to frame plate 40. Continued rotation of plate 56 in the counterclockwise direction about the axis of rotation of roller 74 causes friction pad 64 to be removed from contact with the braking surface 46 and thus drum 42 and spindle 14 are free to rotate, permitting the film to be removed from the supply reel 18.

Movement of the selection lever 30 in the opening 27 to the lower right hand portion of plate 28 for effecting the fast forward mode of operation results in the control plate 56 being shifted to the FIG. 4 position wherein the left end of the arcuate slot 60 engages the pivot stud 58. Although the difference in the position of the control plate 56 between the project mode (in phantom in FIG. 3) and the fast forward mode (shown in FIG. 4) is slight, movement of the selection lever 30 to the fast forward mode also controls other mechanisms of the projector as is described in greater detail in the aforementioned commonly assigned U.S. patent application Ser. Nos. 382,621 and 382,636.

Referring now in particular to FIG. 5, selection lever 30 is shown shifted to the rewind position wherein control plate 56 is moved in a clockwise direction about pivot stud 58 to swing idler roller 74 into contact with belt 54 and displace the belt into driving engagement with the external driving surface 48 on drum 42. The resulting frictional engagement between belt 54 and driving surface 38 is effective to cause drum 42 and spindle 14 to be driven in a counterclockwise direction for rewinding film upon the film reel 18.

While selection lever 39 may be readily moved between the plurality of positions shown on the face plate 28 for positioning the control plate 56 as illustrated in FIGS. 3 through 5, it should be noted that it is necessary to shift the lever 30 through the still position before the projector is changed to another operating mode. As previously mentioned, this results in the braking of the rotation of the spindle 14 thereby preventing the projector from exerting high tension forces upon the film which could cause stretching or breaking of the film when the projector was shifted between fast forward and reverse modes of operation, for example.

Although in the preferred embodiment the driving mechanism of the projector comprises an elastic belt 54 which cooperates with the driving surface 48 through idler roller 74, it would also be possible to use other drive means which could directly drive drum 42 by contacting the external driving surface 48. For example, idler roller 74 could be driven independently and be urged into contact with driving surface 48 by movement of the control plate 56 to the position as shown in FIG. 5. Thus, it should be understood that while the invention has been described in detail with particular reference to a preferred embodiment thereof, variations and modifications can be effected within the spirit and scope of the invention.

I claim:

1. A mechanism for selectively driving and braking a rotatable spindle of a web transporting apparatus, the mechanism comprising:
   a. a cylindrical drum member operatively coupled to said spindle;
   b. drive means including a pulley and a belt, said belt being movable into engagement with said drum member for rotatably driving said spindle;

c. brake means movable into engagement with said drum member for braking said spindle; and d. means for supporting said pulley and said brake means for conjoint movement between (1) a first position wherein said pulley positions said belt into engagement with said drum member for driving said spindle, (2) a second position wherein said brake means restrains said spindle from rotating, and (3) a third position wherein said belt and said brake means are disengaged from said drum member.

2. The mechanism as set forth in claim 1 wherein said cylindrical drum member includes first and second surfaces which are engageable by said belt and said brake means, respectively.

3. The mechanism as set forth in claim 2 wherein said brake means includes a brake pad which is engageable with said second surface.

4. A mechanism for selectively driving and braking a rotatable spindle of a web transporting apparatus, the mechanism comprising:

a. a rotatable member operatively coupled to said spindle;

b. first and second means selectively engageable and disengageable with said rotatable member, said first means for rotatably driving said spindle and said second means for braking rotation of said spindle;

c. a plate adapted to support said first and second means, said plate being pivotally supported by said web transporting apparatus for selectively moving said first and second means between (1) a first position wherein said first means rotatably drives said spindle, (2) a second position wherein said second means restrains rotation of said spindle, and (3) a third position wherein said first and second means are ineffective to drive or restrain rotation of said spindle; and d. control means for selectively moving said plate between said first, second and third positions.

5. A motion picture projector for transporting a received film strip, said projector comprising:

a. a frame;

b. a spindle supported by said frame, said spindle adapted to receive and rotatably support said film strip for winding and unwinding, said spindle including a generally cylindrical lip defining a first surface suitable for rotatably driving said spindle and a second surface suitable for braking rotation of said spindle;

c. drive means selectively movable into engagement with said first surface for rotatably driving said spindle;

d. brake means selectively movable into engagement with said second surface for braking the rotation of said spindle;

e. a control plate supported by said frame for supporting said drive means and said brake means, said control plate being movable for selectively moving said drive means and said brake means between (1) a first position wherein said drive means is in engagement with said first surface causing said spindle to be rotatably driven, (2) a second position wherein said brake means is in engagement with said second surface to restrain said spindle from being rotated, and (3) a third position wherein said drive and brake means are disengaged from said surfaces; and f. control means supported by said frame, said control means being coupled to said control plate for moving said drive means and said brake means between said first, second and third positions.

6. In a motion picture projector having a housing and a rotatable spindle for receiving a roll of film, the improvement comprising:

a. a cylindrical drum member coupled to said spindle, said drum member defining a first surface suitable for rotatably driving said spindle and a second surface suitable for braking rotation of said spindle;

b. a control plate pivotably supported by said housing;

c. a pulley supported by said control plate;

d. a drive belt disposed between said pulley and said first surface of said drum member, said drive belt being displaceable by said pulley to engage said first surface for rotatably driving said spindle;

e. a brake pad supported by said control plate, said brake pad being adapted to cooperate with said second surface of said drum member to brake rotation of said spindle; and f. control means for cooperating with said control plate to move said control plate between (1) a first position wherein said pulley displaces said drive belt to engage said first surface of said drum member to rotatably drive said spindle, (2) a second position wherein said brake pad cooperates with said second surface of said drum member to brake rotation of said spindle, and (3) a third position wherein said pulley is ineffective to displace said belt into engagement with said first surface and said brake pad is ineffective to cooperate with said second surface of said drum member and said spindle is freely rotatable.

7. In a motion picture projector having a housing and a rotatable spindle for receiving a roll of film, the improvement comprising:

a. a cylindrical drum member coupled to said spindle, said drum member defining a first surface suitable for rotatably driving said spindle and a second surface suitable for braking rotation of said spindle;

b. a pivot stud supported by the housing;

c. a control plate which is generally triangular in shape having first, second and third points and having an arcuate opening in the central portion thereof for receiving said pivot stud such that said control plate is pivotally and slidably supported by said pivot stud;

d. drive means movable by said control plate, said drive means including a pulley supported by said control plate near said second point, and a drive belt disposed between said pulley and said first surface of said drum member, said drive belt being displaceable by said pulley to engage said first surface of said drum member for rotatably driving said spindle;

e. a brake pad supported by said control plate near said first point, said brake pad being adapted to cooperate with said second surface of said drum member to brake rotation of said spindle; and f. control means for cooperating with said third point of said control plate to move said control plate between (1) a first position wherein said pulley displaces said drive belt to engage said first surface of said drum member to rotatably drive said spindle, (2) a second position wherein said brake pad cooperates with said second surface of said drum member to brake rotation of said spindle, and (3) a third position wherein said pulley is ineffective to displace said belt into engagement with said first surface and said brake pad is ineffective to cooperate with said second surface of said drum member and said spindle is freely rotatable.

8. The improvement as set forth in claim 7 wherein said control means comprises a control rod coupled to said third point of said control plate and a selection lever movably supported by said housing cooperates to move said control plate between said first, second and third positions.

9. A mechanism for selectively driving and braking a rotatable spindle of a web transporting apparatus, the mechanism comprising:
   a. a rotatable member operatively coupled to the spindle of the apparatus;
   b. driving and braking means for selectively cooperating with said rotatable member for driving or braking the rotation of the spindle of the web transporting apparatus;
   c. a plate having first, second and third portions arranged in a triangular fashion, said drive means being supported by said plate from said first portion and said brake means being supported by said plate at said second portion, said plate being selectively movable between (1) a first position wherein said driving means is positioned to cooperate with said rotatable member to rotatably drive said spindle, (2) a second position wherein said braking means is positioned to cooperate with said rotatable member to restrain rotation of said spindle and (3) a third position wherein said driving and said braking means are no longer positioned to cooperate with said rotatable member for driving or restraining rotation of said spindle; and
   d. control means operatively coupled to said third portion of said plate for selectively moving said plate between said first, second and third positions.

* * * * *